(12) United States Patent
Ali (10) Patent No.: US 12,335,664 B2
(45) Date of Patent: Jun. 17, 2025

(54) SYSTEM AND METHOD FOR TRIGGERING VIDEO RECORDING FOR A VEHICLE

(71) Applicant: GM Global Technology Operations LLC, Detroit, MI (US)

(72) Inventor: Kamran Ali, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 101 days.

(21) Appl. No.: 18/332,967

(22) Filed: Jun. 12, 2023

(65) Prior Publication Data

US 2024/0414288 A1 Dec. 12, 2024

(51) Int. Cl.
| | |
|---|---|
| H04N 7/18 | (2006.01) |
| G06N 20/00 | (2019.01) |
| H04W 24/08 | (2009.01) |
| H04W 84/12 | (2009.01) |

(52) U.S. Cl.
CPC ............. *H04N 7/188* (2013.01); *G06N 20/00* (2019.01); *H04W 24/08* (2013.01); *H04W 84/12* (2013.01)

(58) Field of Classification Search
CPC ..... H04N 7/188; G08B 13/2491; G08B 21/22
See application file for complete search history.

(56) References Cited

U.S. PATENT DOCUMENTS

| | | | |
|---|---|---|---|
| 5,602,734 A | 2/1997 | Kithil | |
| 7,106,203 B2 | 9/2006 | Edwards et al. | |
| 11,600,278 B2 | 3/2023 | Khamis et al. | |
| 2002/0136176 A1 | 9/2002 | Abeta et al. | |
| 2002/0140215 A1 | 10/2002 | Breed et al. | |
| 2004/0119599 A1 | 6/2004 | Stevenson et al. | |
| 2004/0130442 A1 | 7/2004 | Breed et al. | |
| 2007/0221428 A1 | 9/2007 | Strutz et al. | |
| 2008/0077546 A1 | 3/2008 | Hofbeck et al. | |

(Continued)

FOREIGN PATENT DOCUMENTS

| | | |
|---|---|---|
| DE | 10144877 A1 | 4/2003 |
| DE | 10341578 A1 | 4/2005 |
| DE | 102007055091 A1 | 5/2009 |

OTHER PUBLICATIONS

U.S. Appl. No. 17/699,715, filed Mar. 21, 2022.
U.S. Appl. No. 17/699,726, filed Mar. 21, 2022.

*Primary Examiner* — Jayanti K Patel
*Assistant Examiner* — Christopher Kingsbury Glover
(74) *Attorney, Agent, or Firm* — Vivacqua Crane, PLLC (57) ABSTRACT

A system for video recording for a vehicle includes a camera system, a first wireless module, a second wireless module, and a controller in electrical communication with the camera system, the first wireless module, and the second wireless module. The controller is programmed to transmit a plurality of original training signals on a plurality of subcarriers using the first wireless module. The controller is further programmed to receive a plurality of propagated training signals using the second wireless module. The controller is further programmed to determine a deviation between the plurality of original training signals and the plurality of propagated training signals. The controller is further programmed to determine an occupancy status of an environment surrounding the vehicle based at least in part on the deviation and record a video using the camera system in response to determining that the occupancy status is an occupied status.

16 Claims, 6 Drawing Sheets

(56) References Cited

U.S. PATENT DOCUMENTS

| | | |
|---|---|---|
| 2009/0017838 A1 | 1/2009 | Laroia et al. |
| 2013/0314223 A1 | 11/2013 | Masudaya et al. |
| 2014/0057580 A1* | 2/2014 | Rofougaran ......... H04B 1/0067 |
| | | 455/77 |
| 2016/0111878 A1* | 4/2016 | Qureshi ................ H01R 24/30 |
| | | 29/622 |
| 2019/0097865 A1* | 3/2019 | Xu ........................ A61B 5/113 |
| 2020/0169275 A1 | 5/2020 | Chahal et al. |
| 2020/0172049 A1 | 6/2020 | Scheele et al. |
| 2023/0039726 A1 | 2/2023 | Ricart et al. |
| 2023/0262750 A1* | 8/2023 | Krajnc ............... G08B 21/0469 |
| | | 370/328 |
| 2023/0341535 A1* | 10/2023 | Zhang .................. B60W 40/08 |

* cited by examiner

SYSTEM AND METHOD FOR TRIGGERING VIDEO RECORDING FOR A VEHICLE

INTRODUCTION

The present disclosure relates to a system and method for video recording for a vehicle, and more particularly, to a system and method for triggering video recording based on detection of occupants in an environment surrounding the vehicle.

Occupant detection systems may be used to detect the presence of an individual located near a vehicle. Various technologies currently exist for detecting the presence of an individual near a vehicle. For example, one type of occupant detection system may include radar-based sensors disposed with a body of the vehicle to detect the presence of an individual. However, radar-based sensors may be obstructed by objects in the environment, reducing performance. Camera-based systems for detecting within the interior cabin also exist, however, continuous camera recording and/or streaming may result in increased resource use. Touch-based occupant detection mechanisms require an individual to touch the vehicle before triggering recording, which may result in loss of events which occurred prior to contact with the vehicle. Sound-based occupant detection mechanisms may experience reduced performance in environments with loud and/or varying sound levels.

Thus, while current occupant detection systems achieve their intended purpose, there is a need for a new and improved system and method for video recording for a vehicle.

SUMMARY

According to several aspects, a system for video recording for a vehicle is provided. The system includes a camera system, a first wireless module, a second wireless module, and a controller in electrical communication with the camera system, the first wireless module, and the second wireless module. The controller is programmed to transmit a plurality of original training signals on a plurality of subcarriers using the first wireless module. The controller is further programmed to receive a plurality of propagated training signals using the second wireless module. The controller is further programmed to determine a deviation between the plurality of original training signals and the plurality of propagated training signals. The controller is further programmed to determine an occupancy status of an environment surrounding the vehicle based at least in part on the deviation. The occupancy status includes at least one of an occupied status and an unoccupied status. The controller is further programmed to record a video using the camera system in response to determining that the occupancy status is the occupied status.

In another aspect of the present disclosure, to determine the occupancy status of the environment surrounding the vehicle, the controller is further programmed to determine a plurality of channel state information (CSI) values based at least in part on the deviation between the plurality of original training signals and the plurality of propagated training signals. To determine the occupancy status of the environment surrounding the vehicle, the controller is further programmed to determine the occupancy status of the environment surrounding the vehicle based at least in part on the plurality of CSI values.

In another aspect of the present disclosure, to determine the occupancy status of the environment surrounding the vehicle, the controller is further programmed to calculate a plurality of CSI value derivatives. At least one of the plurality of CSI value derivatives corresponds to each of the plurality of subcarriers. To determine the occupancy status of the environment surrounding the vehicle, the controller is further programmed to calculate a plurality of CSI value derivative magnitudes. Each of the plurality of CSI value derivative magnitudes is a magnitude of one of the plurality of CSI value derivatives. To determine the occupancy status of the environment surrounding the vehicle, the controller is further programmed to calculate a norm of the plurality of CSI value derivative magnitudes. To determine the occupancy status of the environment surrounding the vehicle, the controller is further programmed to calculate a time averaged norm signal based at least in part on the norm. To determine the occupancy status of the environment surrounding the vehicle, the controller is further programmed to determine the occupancy status of the environment surrounding the vehicle based at least in part on the time averaged norm signal.

In another aspect of the present disclosure, to determine the occupancy status of the environment surrounding the vehicle, the controller is further programmed to continuously compare the time averaged norm signal to a predetermined time averaged norm signal threshold. To determine the occupancy status of the environment surrounding the vehicle, the controller is further programmed to determine the occupancy status to be the occupied status in response to determining that the time averaged norm signal is greater than or equal to the predetermined time averaged norm signal threshold for at least a predetermined time-period.

In another aspect of the present disclosure, the first wireless module and the second wireless module are digital wireless local area network (WLAN) transceiver systems configured to implement a wireless communication protocol.

In another aspect of the present disclosure, the first wireless module is a digital wireless local area network (WLAN) transceiver system configured to implement a wireless communication protocol. The second wireless module is a signal conversion device configured to convert signals between at least two frequency bands.

In another aspect of the present disclosure, the signal conversion device further may include a power source, at least two antennas, and a conversion circuit in electrical communication with the power source and the at least two antennas. The conversion circuit may include a frequency mixer in electrical communication with the at least two antennas and an oscillator in electrical communication with the frequency mixer.

In another aspect of the present disclosure, the conversion circuit further may include a first amplifier in electrical communication with the a first of the at least two antennas and the frequency mixer. The conversion circuit further may include a second amplifier in electrical communication with the frequency mixer and a second of the at least two antennas.

In another aspect of the present disclosure, the conversion circuit further may include a first bandpass filter in electrical communication with the first amplifier and the frequency mixer. The conversion circuit further may include a second bandpass filter in electrical communication with the frequency mixer and the second amplifier.

In another aspect of the present disclosure, the first bandpass filter has a first center frequency within a first of the at least two frequency bands. The second bandpass filter has a second center frequency within a second of the at least two frequency bands.

According to several aspects, a method for video recording for a vehicle is provided. The method includes determining a plurality of channel state information (CSI) values using a first wireless module and a second wireless module. The method also includes determining an occupancy status of an environment surrounding the vehicle based at least in part on the plurality of channel state information (CSI) values. The occupancy status includes at least one of an occupied status and an unoccupied status. The method also includes recording a video using a camera system in response to determining that the occupancy status is the occupied status.

In another aspect of the present disclosure, determining the plurality of channel state information (CSI) values further may include transmitting a plurality of original training signals on a plurality of subcarriers using the first wireless module. The first wireless module is a digital wireless local area network (WLAN) transceiver system configured to implement a wireless communication protocol. Determining the plurality of CSI values further may include receiving a first plurality of propagated training signals using the second wireless module. The second wireless module is a digital wireless local area network (WLAN) transceiver system configured to implement a wireless communication protocol. Determining the plurality of CSI values further may include determining a first deviation between the plurality of original training signals and the first plurality of propagated training signals. Determining the plurality of CSI values further may include determining the plurality of channel state information (CSI) values based at least in part on the first deviation.

In another aspect of the present disclosure, determining the plurality of channel state information (CSI) values further may include transmitting a plurality of original training signals on a plurality of subcarriers within a first frequency band using the first wireless module. The first wireless module is a digital wireless local area network (WLAN) transceiver system configured to implement a wireless communication protocol. Determining the plurality of CSI values further may include receiving a first plurality of propagated training signals using the second wireless module. The second wireless module is a signal conversion device configured to convert signals between the first frequency band and a second frequency band. Determining the plurality of CSI values further may include transmitting the first plurality of propagated training signals on the second frequency band using the second wireless module. Determining the plurality of CSI values further may include receiving a second plurality of propagated training signals using the first wireless module. Determining the plurality of CSI values further may include determining a second deviation between the plurality of original training signals and the second plurality of propagated training signals. Determining the plurality of CSI values further may include determining the plurality of CSI values based at least in part on the second deviation.

In another aspect of the present disclosure, determining the occupancy status of the environment surrounding the vehicle based at least in part on the plurality of channel state information (CSI) values further may include determining a plurality of dynamic CSI values from the plurality of channel state information (CSI) values. Determining the occupancy status of the environment surrounding the vehicle based at least in part on the plurality of CSI values further may include determining the occupancy status of the environment surrounding the vehicle based at least in part on the plurality of dynamic CSI values.

In another aspect of the present disclosure, determining the plurality of dynamic CSI values from the plurality of channel state information (CSI) values further may include calculating the plurality of dynamic CSI values by calculating a derivative of the plurality of CSI values.

In another aspect of the present disclosure, determining the occupancy status of the environment surrounding the vehicle further may include calculating a plurality of dynamic CSI value magnitudes. Each of the plurality of dynamic CSI value magnitudes is a magnitude of one of the plurality of dynamic CSI values. Determining the occupancy status of the environment surrounding the vehicle further may include calculating a norm of the plurality of dynamic CSI value magnitudes. Determining the occupancy status of the environment surrounding the vehicle further may include calculating a time averaged norm signal based at least in part on the norm. Determining the occupancy status of the environment surrounding the vehicle further may include determining the occupancy status of the environment surrounding the vehicle based at least in part on the time averaged norm signal.

In another aspect of the present disclosure, determining the occupancy status of the environment surrounding the vehicle may include continuously comparing the time averaged norm signal to a predetermined time averaged norm signal threshold. Determining the occupancy status of the environment surrounding the vehicle further may include determining the occupancy status to be the occupied status in response to determining that the time averaged norm signal is greater than or equal to the predetermined time averaged norm signal threshold for at least a predetermined time-period.

According to several aspects, a system for video recording for a vehicle is provided. The system includes a camera system, a first wireless module, a second wireless module, and a controller in electrical communication with the camera system, the first wireless module, and the second wireless module. The controller is programmed to transmit a plurality of original training signals on a plurality of subcarriers using the first wireless module. The controller is further programmed to receive a plurality of propagated training signals using the second wireless module. The controller is further programmed to determine a deviation between the plurality of original training signals and the plurality of propagated training signals. The controller is further programmed to determine a plurality of channel state information (CSI) values based at least in part on the deviation between the plurality of original training signals and the plurality of propagated training signals. The controller is further programmed to determine an occupancy status of an environment surrounding the vehicle based at least in part on the plurality of CSI values. The occupancy status includes one of an occupied status and an unoccupied status. The controller is further programmed to record a video using the camera system in response to determining that the occupancy status is the occupied status.

In another aspect of the present disclosure, to determine the occupancy status of the environment surrounding the vehicle, the controller is further programmed to calculate a plurality of CSI value derivatives. At least one of the plurality of CSI value derivatives corresponds to each of the plurality of subcarriers. To determine the occupancy status of the environment surrounding the vehicle, the controller is further programmed to calculate a plurality of CSI value derivative magnitudes. Each of the plurality of CSI value derivative magnitudes is a magnitude of one of the plurality of CSI value derivatives. To determine the occupancy status of the environment surrounding the vehicle, the controller is further programmed to calculate a norm of the plurality of CSI value derivative magnitudes. To determine the occupancy status of the environment surrounding the vehicle, the controller is further programmed to calculate a time averaged norm signal based at least in part on the norm. To determine the occupancy status of the environment surrounding the vehicle, the controller is further programmed to determine the occupancy status of the environment surrounding the vehicle based at least in part on the time averaged norm signal. To determine the occupancy status of the environment surrounding the vehicle, the controller is further programmed to continuously compare the time averaged norm signal to a predetermined time averaged norm signal threshold. To determine the occupancy status of the environment surrounding the vehicle, the controller is further programmed to determine the occupancy status to be the occupied status in response to determining that the time averaged norm signal is greater than or equal to the predetermined time averaged norm signal threshold for at least a predetermined time-period.

In another aspect of the present disclosure, the first wireless module and the second wireless module are digital wireless local area network (WLAN) transceiver systems configured to implement a wireless communication protocol.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Vehicles may include camera systems which may be used to record events in an environment surrounding the vehicle. When the vehicle is parked and unattended, camera systems may be used to monitor security of the vehicle and capture evidence of tampering and/or damage done to the vehicle by individuals, animals, remote vehicles, and/or the like. However, camera systems must be activated to record video when an event of interest is occurring. The present disclosure provides a new and improved system and method for detecting occupant presence near the vehicle and triggering video recording using wireless communication techniques.

Figure 1:
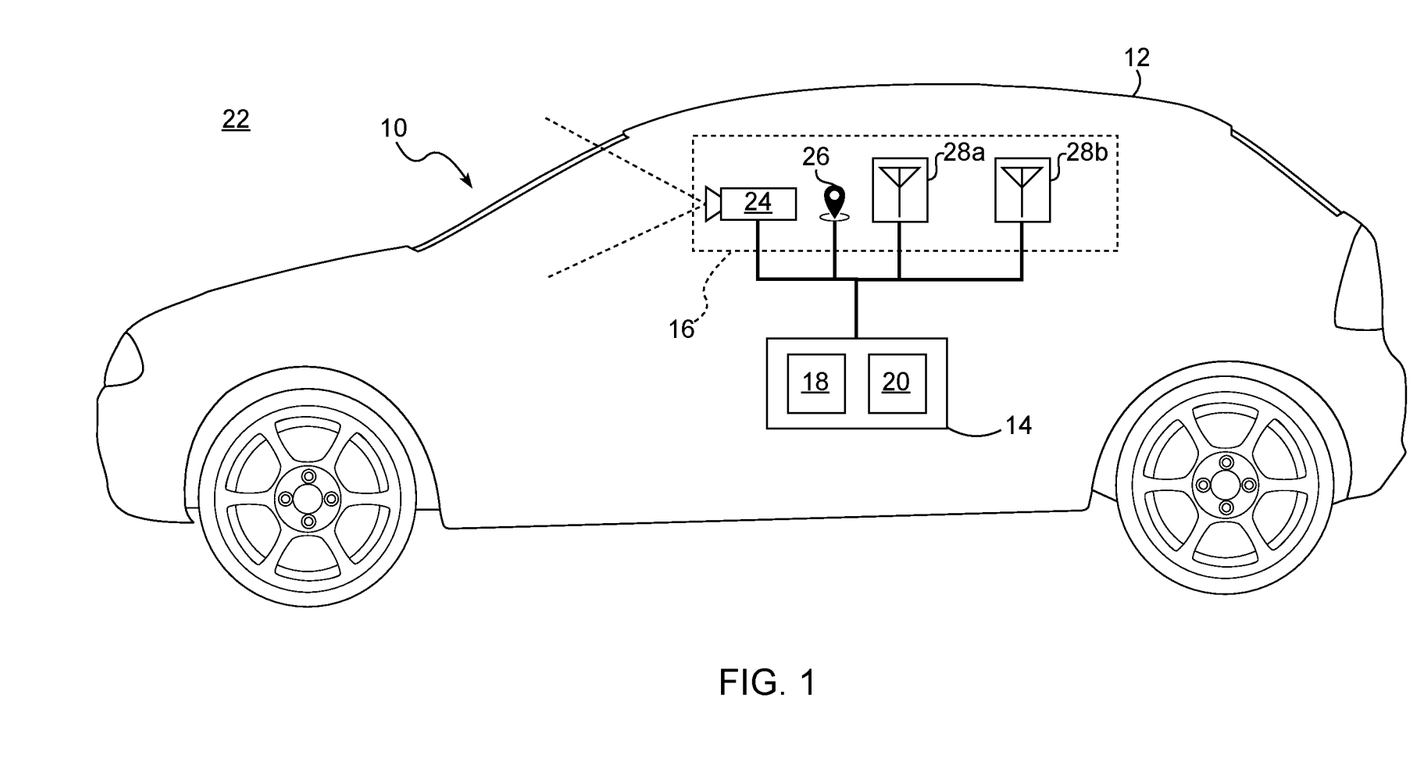
FIG. 1 is a schematic diagram of a system for video recording for a vehicle, according to an exemplary embodiment.

Referring to FIG. 1, a system for video recording for a vehicle is illustrated and generally indicated by reference number 10. The system 10 is shown with an exemplary vehicle 12. While a passenger vehicle is illustrated, it should be appreciated that the vehicle 12 may be any type of vehicle without departing from the scope of the present disclosure. The system 10 generally includes a controller 14 and a plurality of vehicle sensors 16.

The controller 14 is used to implement a method 100 for video recording for a vehicle, as will be described below. The controller 14 includes at least one processor 18 and a non-transitory computer readable storage device or media 20. The processor 18 may be a custom made or commercially available processor, a central processing unit (CPU), a graphics processing unit (GPU), an auxiliary processor among several processors associated with the controller 14, a semiconductor-based microprocessor (in the form of a microchip or chip set), a macroprocessor, a combination thereof, or generally a device for executing instructions. The computer readable storage device or media 20 may include volatile and nonvolatile storage in read-only memory (ROM), random-access memory (RAM), and keep-alive memory (KAM), for example. KAM is a persistent or non-volatile memory that may be used to store various operating variables while the processor 18 is powered down. The computer-readable storage device or media 20 may be implemented using a number of memory devices such as PROMs (programmable read-only memory), EPROMS (electrically PROM), EEPROMs (electrically erasable PROM), flash memory, or another electric, magnetic, optical, or combination memory devices capable of storing data, some of which represent executable instructions, used by the controller 14 to control various systems of the vehicle 12. The controller 14 may also consist of multiple controllers which are in electrical communication with each other. The controller 14 may be inter-connected with additional systems and/or controllers of the vehicle 12, allowing the controller 14 to access data such as, for example, speed, acceleration, braking, and steering angle of the vehicle 12.

The controller 14 is in electrical communication with the plurality of vehicle sensors 16. In an exemplary embodiment, the electrical communication is established using, for example, a CAN network, a FLEXRAY network, a local area network (e.g., WiFi, ethernet, and the like), a serial peripheral interface (SPI) network, or the like. It should be understood that various additional wired and wireless techniques and communication protocols for communicating with the controller 14 are within the scope of the present disclosure.

The plurality of vehicle sensors 16 are used to acquire information about an environment 22 surrounding the vehicle 12. In an exemplary embodiment, the plurality of vehicle sensors 16 includes at least a camera system 24, a global navigation satellite system (GNSS) 26, a first wireless module 28a, and a second wireless module 28b.

In another exemplary embodiment, the plurality of vehicle sensors 16 further includes sensors to determine performance data about the vehicle 12. In an exemplary embodiment, the plurality of vehicle sensors 16 further includes at least one of a motor speed sensor, a motor torque sensor, an electric drive motor voltage and/or current sensor, an accelerator pedal position sensor, a coolant temperature sensor, a cooling fan speed sensor, and a transmission oil temperature sensor.

In another exemplary embodiment, the plurality of vehicle sensors 16 further includes sensors to determine information about the environment within the vehicle 12, such as, for example, a seat occupancy sensor, a cabin air temperature sensor, a cabin motion detection sensor, a cabin camera, a cabin microphone, and/or the like.

In another exemplary embodiment, the plurality of vehicle sensors 16 further includes sensors to determine information about the environment surrounding the vehicle 12, for example, an ambient air temperature sensor, a barometric pressure sensor, and/or a photo and/or video camera which is positioned to view the environment in front of the vehicle 12.

In another exemplary embodiment, at least one of the plurality of vehicle sensors 16 is capable of measuring distances in the environment surrounding the vehicle 12. In a non-limiting example, the plurality of vehicle sensors 16 includes a stereoscopic camera having distance measurement capabilities. In one example, at least one of the plurality of vehicle sensors 16 is affixed inside of the vehicle 12, for example, in a headliner of the vehicle 12, having a view through a windscreen of the vehicle 12. In another example, at least one of the plurality of vehicle sensors 16 is affixed outside of the vehicle 12, for example, on a roof of the vehicle 12, having a view of the environment surrounding the vehicle 12. It should be understood that various additional types of vehicle sensors, such as, for example, LiDAR sensors, ultrasonic ranging sensors, radar sensors, and/or time-of-flight sensors are within the scope of the present disclosure. The plurality of vehicle sensors 16 are in electrical communication with the controller 14 as discussed above.

The camera system 24 is used to capture images and/or videos of the environment 22 surrounding the vehicle 12. In an exemplary embodiment, the camera system 24 includes a photo and/or video camera which is positioned to view the environment 22 surrounding the vehicle 12. In a non-limiting example, the camera system 24 includes a camera affixed inside of the vehicle 12, for example, in a headliner of the vehicle 12, having a view through a windscreen of the vehicle 12. In another non-limiting example, the camera system 24 includes a camera affixed outside of the vehicle 12, for example, on a roof of the vehicle 12, having a view of the environment 22 in front of the vehicle 12.

In another exemplary embodiment, the camera system 24 is a surround view camera system including a plurality of cameras (also known as satellite cameras) arranged to provide a view of the environment 22 adjacent to all sides of the vehicle 12. In a non-limiting example, the camera system 24 includes a front-facing camera (mounted, for example, in a front grille of the vehicle 12), a rear-facing camera (mounted, for example, on a rear tailgate of the vehicle 12), and two side-facing cameras (mounted, for example, under each of two side-view mirrors of the vehicle 12). In another non-limiting example, the camera system 24 further includes an additional rear-view camera mounted near a center high mounted stop lamp of the vehicle 12.

It should be understood that camera systems having additional cameras and/or additional mounting locations are within the scope of the present disclosure. It should further be understood that cameras having various sensor types including, for example, charge-coupled device (CCD) sensors, complementary metal oxide semiconductor (CMOS) sensors, and/or high dynamic range (HDR) sensors are within the scope of the present disclosure. Furthermore, cameras having various lens types including, for example, wide-angle lenses and/or narrow-angle lenses are also within the scope of the present disclosure.

The GNSS 26 is used to determine a geographical location of the vehicle 12. In an exemplary embodiment, the GNSS 26 is a global positioning system (GPS). In a non-limiting example, the GPS includes a GPS receiver antenna (not shown) and a GPS controller (not shown) in electrical communication with the GPS receiver antenna. The GPS receiver antenna receives signals from a plurality of satellites, and the GPS controller calculates the geographical location of the vehicle 12 based on the signals received by the GPS receiver antenna. In an exemplary embodiment, the GNSS 26 additionally includes a map. The map includes information about infrastructure such as municipality borders, roadways, railways, sidewalks, buildings, and the like. Therefore, the geographical location of the vehicle 12 is contextualized using the map information. In a non-limiting example, the map is retrieved from a remote source using a wireless connection. In another non-limiting example, the map is stored in a database of the GNSS 26. It should be understood that various additional types of satellite-based radionavigation systems, such as, for example, the Global Positioning System (GPS), Galileo, GLONASS, and the BeiDou Navigation Satellite System (BDS) are within the scope of the present disclosure. It should be understood that the GNSS 26 may be integrated with the controller 14 (e.g., on a same circuit board with the controller 14 or otherwise a part of the controller 14) without departing from the scope of the present disclosure.

Figure 2:
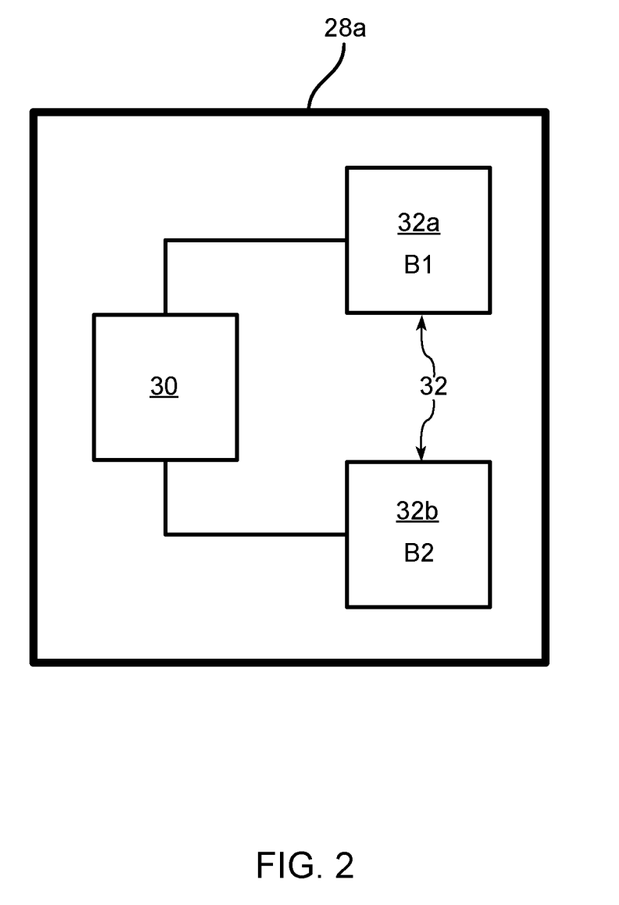
FIG. 2 is a schematic diagram of the first wireless module, according to an exemplary embodiment.

Referring to FIG. 2, a schematic diagram of the first wireless module 28a is shown. With reference to FIG. 2 and continued reference to FIG. 1, the first wireless module 28a is used to wirelessly communicate with other systems internal and/or external to the vehicle 12, for example, the second wireless module 28b. In an exemplary embodiment, the first wireless module 28a includes a wireless control module 30 capable of implementing a wireless communication protocol which employs training signals for performing channel state information (CSI) estimation. In a non-limiting example, the first wireless module 28a supports a wireless communication protocol according to one or more of the Institute of Electrical and Electronics Engineers (IEEE) 802.11 wireless local area network (WLAN) related standards. Accordingly, the first wireless module 28a is also referred to as a digital wireless local area network (WLAN) transceiver system. In an exemplary embodiment, the first wireless module 28a includes at least one wireless transceiver module 32 in electrical communication with the wireless control module 30. The at least one wireless transceiver module 32 is configured to transmit and receive signals on a first frequency band B1 (e.g., a 2.4 GHz frequency band). In another exemplary embodiment, the first wireless module 28a includes at least two wireless transceiver modules 32, as shown in FIG. 2. A first wireless transceiver module 32a is configured to transmit and receive signals on the first frequency band B1. A second wireless transceiver module 32b is configured to transmit and receive signals on a second frequency band B2 (e.g., a 5 GHz frequency band).

In an exemplary embodiment, the first frequency band B1 and/or the second frequency band B2 are divided into a plurality of subfrequencies (i.e., subcarriers). Data to be transmitted is divided into a plurality of data streams. Each of the plurality of data streams is modulated with one of the plurality of subcarriers for transmission. In an exemplary embodiment, training signals for performing channel state information (CSI) estimation are transmitted on one or more subcarriers per frequency band. In a non-limiting example, three subcarriers within the first frequency band B1 and/or the second frequency band B2 are used to transmit and/or receive training signals. In another non-limiting example, all subcarriers within the first frequency band B1 and/or the second frequency band B2 are used to transmit and/or receive training signals.

The second wireless module 28b is used to wirelessly communicate with other systems internal and/or external to the vehicle 12, for example, the first wireless module 28a. In a first exemplary embodiment, the first wireless module 28a includes at least one wireless transceiver module 32 is configured to transmit and receive signals on the first frequency band B1 as discussed above, and the second wireless module 28b is identical in structure and function to the first wireless module 28a, also having at least one wireless transceiver module 32 configured to transmit and receive signals on the first frequency band B1.

Figure 3:
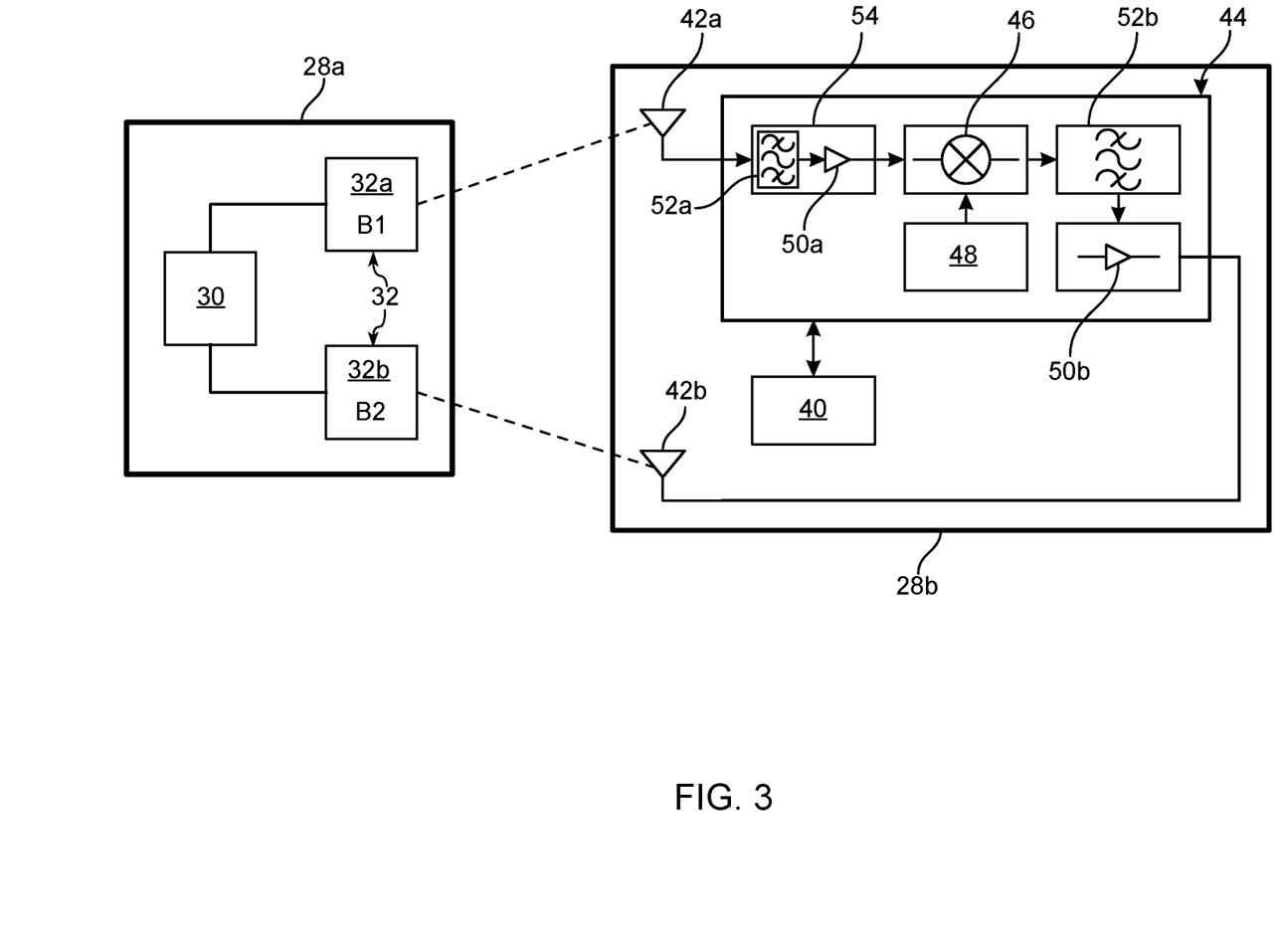
FIG. 3 is a schematic diagram of the first wireless module with a second wireless module, according to an exemplary embodiment.

Referring to FIG. 3, a schematic diagram of the first wireless module 28a with the second wireless module 28b is shown. In a second exemplary embodiment, the first wireless module 28a includes at least two wireless transceiver modules 32, as discussed above. The second wireless module 28b is a signal conversion device configured to convert signals between the first frequency band B1 and the second frequency band B2. In an exemplary embodiment, second wireless module 28b includes a power source 40, at least two antennas (i.e., a first antenna 42a and a second antenna 42b), and a conversion circuit 44.

The power source 40 is used to provide power to the conversion circuit 44. In an exemplary embodiment, the power source 40 is a connection to a power system of the vehicle 12, for example, a twelve-volt electrical system of the vehicle 12. In another exemplary embodiment, the power source 40 is a battery. In another exemplary embodiment, the power source 40 is an energy harvesting device configured to harvest energy from, for example radio frequency signals, light, vibrations, heat, and/or the like, and transform the harvested energy into electrical energy. The power source 40 is in electrical communication with the conversion circuit 44. It should be understood that the power source 40 may be any device capable of providing electrical power to the conversion circuit 44 without departing from the scope of the present disclosure.

The at least two antennas (i.e., the first antenna 42a and the second antenna 42b) are used to transmit and/or receive wireless communication signals. The first antenna 42a is used to receive wireless communication signals on the first frequency band B1, for example, wireless communication signals transmitted by the first wireless transceiver module 32a, as shown in FIG. 3. The second antenna 42b is used to transmit wireless communication signals on the second frequency band B2, for example, wireless communication signals which may be received by the second wireless transceiver module 32b, as shown in FIG. 3. The first antenna 42a and the second antenna 42b are in electrical communication with the conversion circuit 44, as will be discussed in greater detail below.

The conversion circuit 44 is used to convert wireless communication signals between the first frequency band B1 and the second frequency band B2. In an exemplary embodiment, the conversion circuit 44 includes a frequency mixer 46, an oscillator 48, a first amplifier 50a, a second amplifier 50b, a first bandpass filter 52a, and a second bandpass filter 52b. In an exemplary embodiment, the first amplifier 50a and the first bandpass filter 52a are packaged as a monolithic integrated circuit referred to as a combined amplifier with bandpass filter (LNA+BPF) 54.

The frequency mixer 46 is used to convert signals received using the first antenna 42a between the first frequency band B1 and the second frequency band B2, also known as heterodyning. In an exemplary embodiment, the frequency mixer 46 is a passive frequency mixer including passive components, such as, for example, diodes. In another exemplary embodiment, the frequency mixer 46 is an active frequency mixer including active components, such as, for example, transistors. In a non-limiting example, the frequency mixer 46 produces a signal at a mixer output of the frequency mixer 46 which is a product of two input signals supplied to a first mixer input and a second mixer input. The first mixer input of the frequency mixer 46 is in electrical communication with the oscillator 48. The second mixer input of the frequency mixer 46 is in electrical communication with the first amplifier 50a. The mixer output of the frequency mixer 46 is in electrical communication with the second bandpass filter 52b.

The oscillator 48 is used to produce an oscillating signal with a known frequency for the frequency mixer 46. In an exemplary embodiment, the oscillator 48 is referred to as a local oscillator. In a non-limiting example, the oscillator 48 is a crystal oscillator utilizing a piezoelectric element to produce the oscillating signal. In another non-limiting example, the oscillator 48 is a variable-frequency oscillator capable of producing oscillating signals having a variable frequency. The oscillator 48 is in electrical communication with the first mixer input of the frequency mixer 46. In an exemplary embodiment, the oscillator 48 receives electrical power from the power source 40.

The first amplifier 50a is used to amplify signals received by the first antenna 42a. In an exemplary embodiment, the first amplifier 50a is a low-noise amplifier (LNA). LNAs are designed to amplify a very low-power signal, such as an electrical current generated by an antenna, without significantly degrading the signal-to-noise ratio of the signal. In a non-limiting example, the first amplifier 50a also includes filters or other electronic circuits designed to remove undesired signal and/or noise from the electrical currents generated by the first antenna 42a. In a non-limiting example, the power source 40 supplies power and a DC bias signal to the first amplifier 50a. It should be understood that various additional types and/or topologies of amplifier may be used to amplify the electrical currents generated by the first antenna 42a. The first amplifier 50a is in electrical communication with the first bandpass filter 52a and the second mixer input of the frequency mixer 46.

The second amplifier 50b is used to amplify signals produced by the frequency mixer 46 for transmission by the second antenna 42b. In a non-limiting example, the power source 40 supplies power and a DC bias signal to the second amplifier 50b. It should be understood that various additional types and/or topologies of amplifier may be used to amplify the electrical signals generated by the frequency mixer 46 for transmission by the second antenna 42b. The second amplifier 50b is in electrical communication with the second bandpass filter 52b and the second antenna 42b.

The first bandpass filter 52a is used to filter signals received by the first antenna 42a. In an exemplary embodiment, the first bandpass filter 52a is a passive device utilizing resistors, inductors, and/or capacitors to achieve bandpass filtering. In another exemplary embodiment, the first bandpass filter 52a is an active device utilizing active components such as, for example, operational amplifiers, to achieve bandpass filtering. The center frequency of the first bandpass filter 52a is within the first frequency band B1, for example, at a center of the first frequency band B1. The first bandpass filter 52a is in electrical communication with the first antenna 42a and the first amplifier 50a.

The second bandpass filter 52b is used to attenuate extraneous frequency components introduced by the frequency mixer 46. In an exemplary embodiment, the second bandpass filter 52b is a passive device utilizing resistors, inductors, and/or capacitors to achieve bandpass filtering. In another exemplary embodiment, the second bandpass filter 52b is an active device utilizing active components such as, for example, operational amplifiers, to achieve bandpass filtering. The center frequency of the second bandpass filter 52b is within the second frequency band B2, for example, at a center of the second frequency band B2. The second bandpass filter 52b is in electrical communication with the mixer output of the frequency mixer 46 and the second amplifier 50b.

Figure 4:
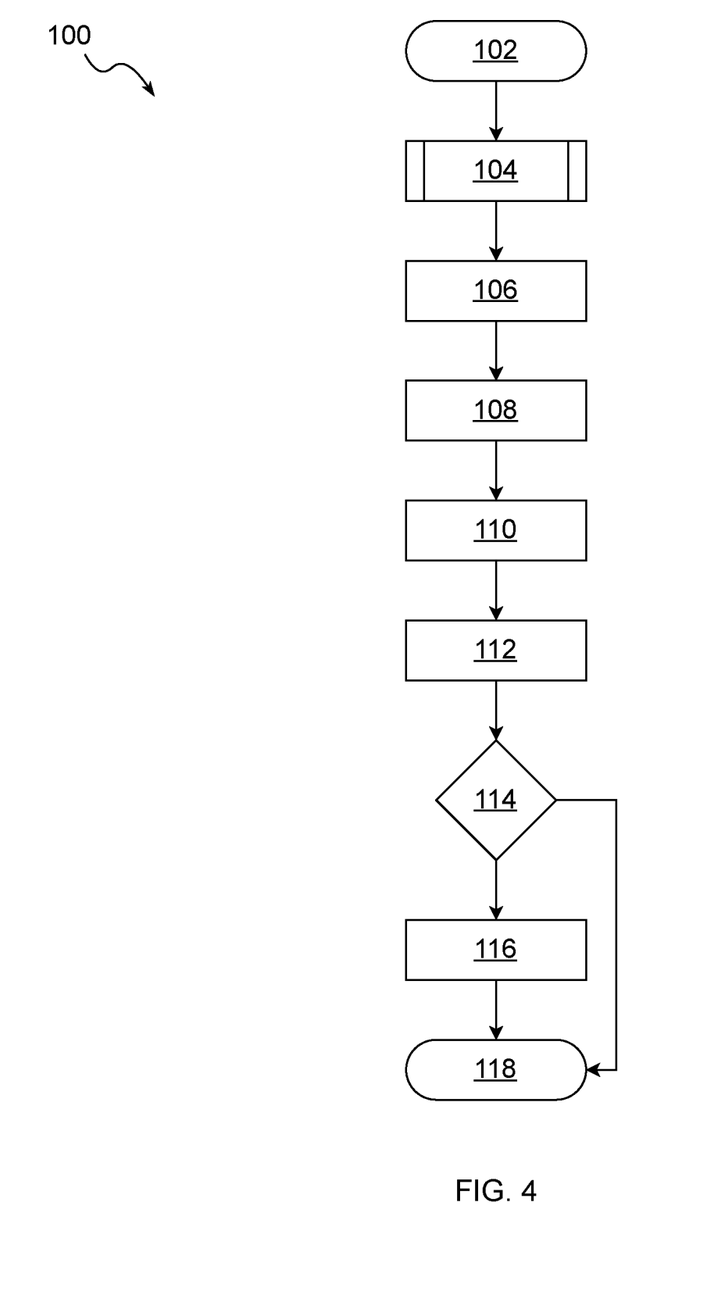
FIG. 4 is a flowchart of a method for video recording for a vehicle, according to an exemplary embodiment.

Referring to FIG. 4, the method 100 for video recording for a vehicle begins at block 102 and proceeds to block 104. At block 104, the controller 14 uses the first wireless transceiver module 32a and the second wireless transceiver module 32b to determine a plurality of channel state information (CSI) values, as will be discussed in greater detail below. In the scope of the present disclosure, CSI values describe how signals propagate between the first wireless transceiver module 32a and the second wireless transceiver module 32b. More specifically, the CSI values represent the combined effects of, for example, scattering, fading, and power decay. In other words, CSI is an estimate of frequency response for a transmission channel between two or more transceivers. In some applications, CSI values may be used to adapt transmission characteristics based on environmental conditions. In the present disclosure, the CSI values are used to quantify movement in the environment surrounding the vehicle 12, as will be discussed in greater detail below. In an exemplary embodiment, at least one of the plurality of CSI values corresponds to each of a plurality of subcarriers (i.e., subfrequencies), as will be discussed in greater detail below. After block 104, the method 100 proceeds to block 106.

At block 106, the controller 14 calculates a plurality of CSI value derivatives. In an exemplary embodiment, the plurality of CSI values are divided into a plurality of CSI value subsets, wherein each of the plurality of CSI value subsets corresponds to one of the plurality of subcarriers. The controller 14 calculates a time-value derivative of each of the plurality of CSI value subsets. Therefore, each of the plurality of CSI value derivatives corresponds to a change in CSI value over time for each of the plurality of subcarriers. Accordingly, the plurality of CSI value derivatives are also referred to as a plurality of dynamic CSI values. After block 106, the method 100 proceeds to block 108.

At block 108, the controller 14 determines a plurality of CSI value derivative magnitudes. The plurality of CSI value derivative magnitudes are also referred to as a plurality of dynamic CSI value magnitudes. In an exemplary embodiment, the each of the plurality of CSI value derivatives includes a magnitude component and a phase component. To calculate the plurality of CSI value derivative magnitudes, the controller 14 takes the magnitude of each of the plurality of CSI value derivatives, discarding the phase component. After block 108, the method 100 proceeds to block 110.

At block 110, the controller 14 calculates a norm of the plurality of CSI value derivative magnitudes. In an exemplary embodiment, to calculate the norm, the controller 14 calculates a norm of a one-dimensional vector including the plurality of CSI value derivative magnitudes. In a non-limiting example, the norm is calculated as a square root of the squared sum of each of the plurality of CSI value derivative magnitudes:

$$p = \sqrt{\sum_{i=1}^{N} C_i^2} \quad (1)$$

wherein p is the norm, $C_i$ is an $i^{th}$ one of the plurality of CSI value derivative magnitudes, and N is a total quantity of the plurality of CSI value derivative magnitudes. In an exemplary embodiment, the norm is saved in the media 20 of the controller 14 along with previous and future norms for further processing, as will be discussed in greater detail below. After block 110, the method 100 proceeds to block 112.

At block 112, the controller 14 calculates a time averaged norm signal. It should be understood that the method 100 may be executed repeatedly, such that multiple previous norms calculated at block 110 are available in the media 20. In an exemplary embodiment, time averaged norm signal is a moving median of the previous norms calculated at block 110 and stored in the media 20. In another exemplary embodiment, the time averaged norm signal is a moving average of previous norms calculated at block 110 and stored in the media 20. It should be understood that any statistical method for smoothing short-term fluctuations in time series data is within the scope of the present disclosure. After block 112, the method 100 proceeds to block 114.

At block 114, the controller 14 compares the time averaged norm signal determined at block 112 to a predetermined time averaged norm signal threshold. In an exemplary embodiment, the predetermined time averaged norm signal threshold is determined experimentally and may be adjusted to adjust a sensitivity of the system 10. If the time averaged norm signal remains greater than or equal to the predetermined time averaged norm signal threshold for at least a predetermined time-period (e.g., 2 seconds), the method 100 proceeds to block 116. If the time averaged norm signal is not greater than or equal to the predetermined time averaged norm signal threshold for at least the predetermined time-period, the method 100 proceeds to enter a standby state at block 118.

At block 116, the controller 14 determines an occupancy status of the environment 22 surrounding the vehicle 12 to be an occupied status. In the scope of the present disclosure, the occupancy status includes the occupied status and an unoccupied status. The occupied status means that an entity (i.e., a person, an animal, and/or an inanimate object in motion) is present in the environment 22 surrounding the vehicle 12. The unoccupied status means that no entity is present in the environment 22 surrounding the vehicle 12. In an exemplary embodiment, in response to determining the occupancy status to be the occupied status, the controller 14 uses the camera system 24 to record a video of the environment 22 surrounding the vehicle 12. Accordingly, the video captures the entity in the environment 22 surrounding the vehicle 12. For example, if the entity were to damage and/or tamper-with the vehicle 12, the video could be used as evidence. In another exemplary embodiment, in response to determining the occupancy status to be the occupied status, the controller 14 activates a security system of the vehicle 12, for example, activating an alarm system of the vehicle 12 to deter tampering with the vehicle 12.

It should be understood that the signal processing methods described above to analyze the plurality of CSI values and determine the occupancy status are merely exemplary in nature, and that alternative methods, such as, for example, standard deviation-based thresholding, activity pattern recognition, machine learning models, and/or the like are within the scope of the present disclosure.

In an exemplary embodiment, the controller 14 repeatedly exits the standby state 118 and restarts the method 100 at block 102. In a non-limiting example, the controller 14 exits the standby state 118 and restarts the method 100 on a timer, for example, every three hundred milliseconds. By repeatedly performing the method 100, multiple measurements of the environment 22 are performed and logged.

Figure 5:
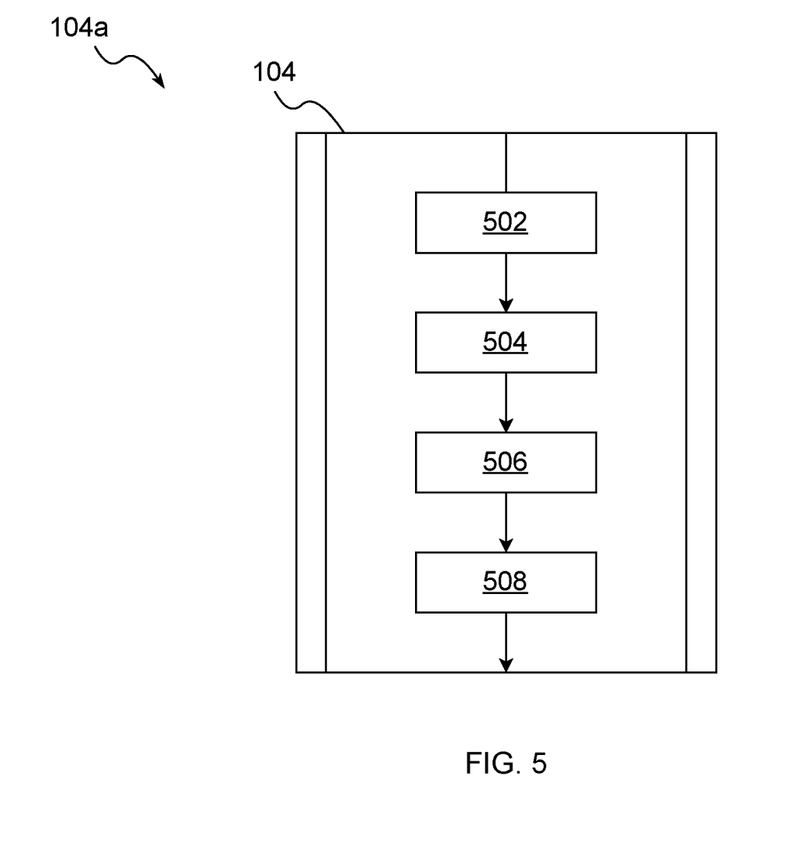
FIG. 5 is a first exemplary embodiment of a method for determining a plurality of channel state information (CSI) values, according to an exemplary embodiment.

Referring to FIG. 5, a flowchart of a first exemplary embodiment 104a of block 104 is shown. The first exemplary embodiment 104a utilizes an embodiment of the system 10 wherein the first wireless module 28a includes at least one wireless transceiver module 32 configured to transmit and receive signals on the first frequency band B1, and wherein the second wireless module 28b is identical in structure and function to the first wireless module 28a. The first exemplary embodiment 104a begins at block 502. At block 502, the controller 14 transmits a plurality of original training signals on the plurality of subcarriers using the first wireless module 28a. In the scope of the present disclosure, the plurality of original training signals are known signals which are transmitted for purposes of CSI value estimation. After block 502, the first exemplary embodiment 104a proceeds to block 504.

At block 504, the second wireless module 28b receives a first plurality of propagated training signals from the first wireless module 28a. The received training signals are referred to as propagated training signals because environmental characteristics result in changes to the original training signals during propagation, as discussed above. It should be understood that other devices having wireless capabilities, such as, for example, a smartphone or other mobile device in the vehicle 12 may perform the function of the second wireless module 28b in some embodiments. After block 504, the first exemplary embodiment 104a proceeds to block 506.

At block 506, the controller 14 determines a first deviation between the plurality of original training signals and the first plurality of propagated training signals. In an exemplary embodiment, the first deviation is a difference between the plurality of original training signals and the first plurality of propagated training signals. In a non-limiting example, the first deviation is one-dimensional vector including deviations corresponding to transmissions on each subcarrier frequency. After block 506, the first exemplary embodiment 104a proceeds to block 508.

At block 508, the controller 14 determines the plurality of channel state information (CSI) values. In an exemplary embodiment, the plurality of CSI values are determined based at least in part on the first deviation. After block 508, the first exemplary embodiment 104a is concluded, and the method 100 continues as discussed above.

Figure 6:
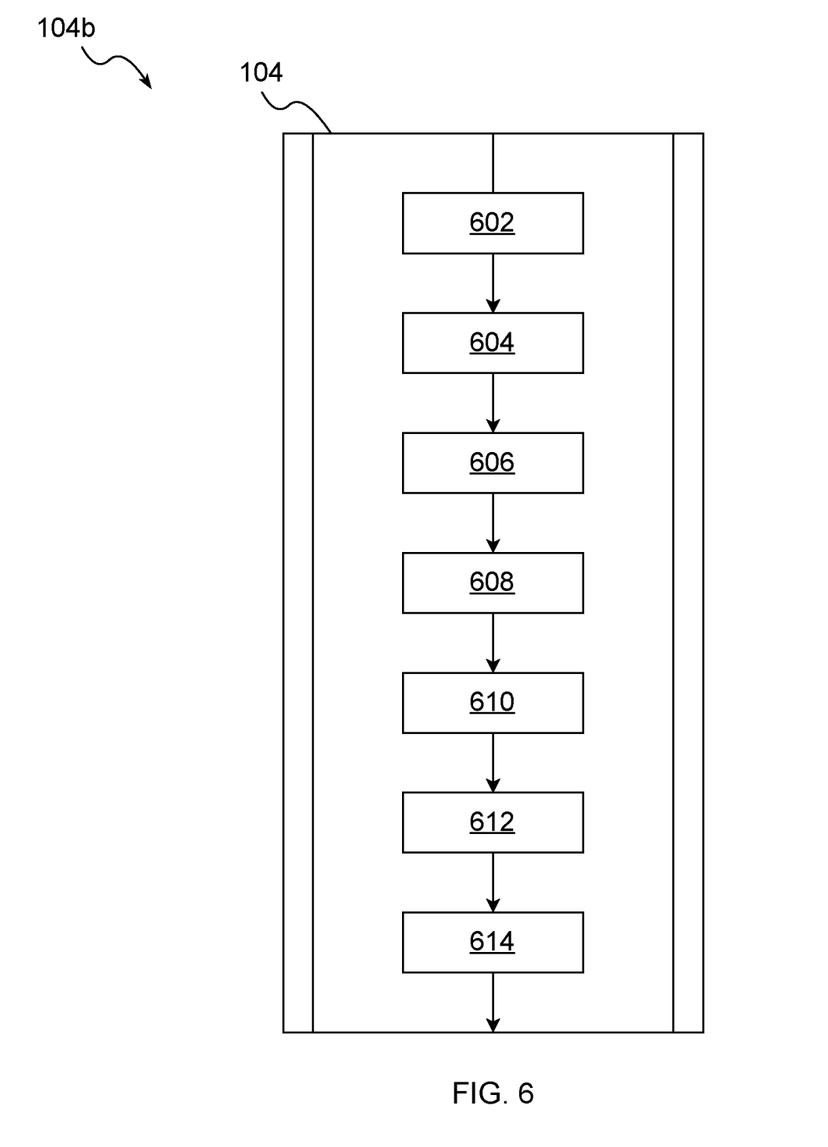
FIG. 6 is a second exemplary embodiment of a method for determining a plurality of channel state information (CSI) values, according to an exemplary embodiment.

Referring to FIG. 6, a flowchart of a second exemplary embodiment 104b of block 104 is shown. The second exemplary embodiment 104b utilizes an embodiment of the system 10 wherein the first wireless module 28a includes at least two wireless transceiver modules 32 and is configured to transmit and receive signals on the first frequency band B1 and the second frequency band B2, and wherein the second wireless module 28b is a signal conversion device configured to convert signals between the first frequency band B1 and the second frequency band B2. The second exemplary embodiment 104b begins at block 602. At block 602, the controller 14 transmits the plurality of original training signals on the plurality of subcarriers using the first wireless transceiver module 32a of the first wireless module 28a on the first frequency band B1. In the scope of the present disclosure, the plurality of original training signals are known signals which are transmitted for purposes of CSI value estimation. After block 602, the second exemplary embodiment 104b proceeds to block 604.

At block 604, the second wireless module 28b receives the first plurality of propagated training signals using the first antenna 42a. After block 604, the second exemplary embodiment 104b proceeds to block 606.

At block 606, the second wireless module 28b uses the conversion circuit 44 to convert the first plurality of propagated training signals received at block 604 from the first frequency band B1 to the second frequency band B2, as discussed above. After block 606, the second exemplary embodiment 104b proceeds to block 608.

At block 608, the second wireless module 28b uses the second antenna 42b to transmit the first plurality of propagated training signals on the second frequency band B2. After block 608, the second exemplary embodiment 104b proceeds to block 610.

At block 610, the first wireless module 28a uses the second wireless transceiver module 32b to receive a second plurality of propagated training signals on the second frequency band B2. The received training signals are referred to as the second plurality of propagated training signals because environmental characteristics result in changes to the first plurality of training signals during propagation, as discussed above. After block 610, the second exemplary embodiment 104b proceeds to block 612.

At block 612, the controller 14 determines a second deviation between the plurality of original training signals and the second plurality of propagated training signals. In an exemplary embodiment, the second deviation is a difference between the plurality of original training signals and the second plurality of propagated training signals. In a non-limiting example, the second deviation is one-dimensional vector including deviations corresponding to transmissions on each subcarrier frequency. After block 612, the second exemplary embodiment 104b proceeds to block 614.

At block 614, the controller 14 determines the plurality of channel state information (CSI) values. In an exemplary embodiment, the plurality of CSI values are determined based at least in part on the second deviation. After block 614, the second exemplary embodiment 104b is concluded, and the method 100 continues as discussed above.

The system 10 and method 100 of the present disclosure offer several advantages. Using the system 10 and method 100, occupancy detection near the vehicle may be accomplished with low power consumption, allowing for constant monitoring without excessive resource use. Additionally, components of the system 10 may already be present on the vehicle 12 for other functions. Therefore, utilizing such components for the system 10 and method 100 is advantageous. Furthermore, parameters of the system 10 and/or method 100 may be adjusted. For example, the predetermined time averaged norm signal threshold may be adjusted to tune the sensitivity of the system 10 based on environmental context. In an exemplary embodiment, the GNSS 26 is used to determine a location of the vehicle 12, and the controller 14 adjusts the predetermined time averaged norm signal threshold based on the location of the vehicle 12. In an exemplary embodiment, the sensitivity of the system 10 is increased if the vehicle 12 is in a location where tampering is more likely, such as, for example, in a public parking lot.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A system for video recording for a vehicle, the system comprising:
   a camera system;
   a first wireless module, wherein the first wireless module is a digital wireless local area network (WLAN) transceiver system configured to implement a wireless communication protocol;
   a second wireless module, wherein the second wireless module is a signal conversion device which converts signals between at least two frequency bands including a first frequency band and a second frequency band;
   a controller in electrical communication with the camera system, the first wireless module, and the second wireless module, wherein the controller is programmed to:
      transmit a plurality of original training signals to the second wireless module on a plurality of subcarriers within the first frequency band using the first wireless module, wherein the plurality of original training signals are known signals which are transmitted for purposes of channel state information (CSI) value estimation;
      receive a first plurality of propagated training signals using the second wireless module, wherein the first plurality of propagated training signals originated from the first wireless module as the plurality of original training signals;
      convert the first plurality of propagated training signals from the first frequency band to the second frequency band using the second wireless module;
      transmit the first plurality of propagated training signals to the first wireless module on the second frequency band using the second wireless module;
      receive a second plurality of propagated training signals using the first wireless module, wherein the second plurality of propagated training signals originated from the second wireless module as the first plurality of propagated training signals;
      determine a deviation between the plurality of original training signals and the second plurality of propagated training signals;
      determine an occupancy status of an environment surrounding the vehicle based at least in part on the deviation, wherein the occupancy status includes at least one of an occupied status and an unoccupied status; and
      record a video using the camera system in response to determining that the occupancy status is the occupied status.

2. The system of claim 1, wherein to determine the occupancy status of the environment surrounding the vehicle, the controller is further programmed to:
   determine a plurality of CSI values based at least in part on the deviation between the plurality of original training signals and the second plurality of propagated training signals; and
   determine the occupancy status of the environment surrounding the vehicle based at least in part on the plurality of CSI values.

3. The system of claim 2, wherein to determine the occupancy status of the environment surrounding the vehicle, the controller is further programmed to:
   calculate a plurality of CSI value derivatives, wherein at least one of the plurality of CSI value derivatives corresponds to each of the plurality of subcarriers;
   calculate a plurality of CSI value derivative magnitudes, wherein each of the plurality of CSI value derivative magnitudes is a magnitude of one of the plurality of CSI value derivatives;
   calculate a norm of the plurality of CSI value derivative magnitudes;
   calculate a time averaged norm signal based at least in part on the norm; and
   determine the occupancy status of the environment surrounding the vehicle based at least in part on the time averaged norm signal.

4. The system of claim 3, wherein to determine the occupancy status of the environment surrounding the vehicle, the controller is further programmed to:
   continuously compare the time averaged norm signal to a predetermined time averaged norm signal threshold; and
   determine the occupancy status to be the occupied status in response to determining that the time averaged norm signal is greater than or equal to the predetermined time averaged norm signal threshold for at least a predetermined time-period.

5. The system of claim 1, wherein the signal conversion device further comprises:
   a power source;
   at least two antennas;
   a conversion circuit in electrical communication with the power source and the at least two antennas, the conversion circuit including:
      a frequency mixer in electrical communication with the at least two antennas; and
      an oscillator in electrical communication with the frequency mixer.

6. The system of claim 5, wherein the conversion circuit further comprises:
   a first amplifier in electrical communication with a first of the at least two antennas and the frequency mixer; and
   a second amplifier in electrical communication with the frequency mixer and a second of the at least two antennas.

7. The system of claim 6, wherein the conversion circuit further comprises:
   a first bandpass filter in electrical communication with the first amplifier and the frequency mixer; and
   a second bandpass filter in electrical communication with the frequency mixer and the second amplifier.

8. The system of claim 7, wherein the first bandpass filter has a first center frequency within the first frequency band, and wherein the second bandpass filter has a second center frequency within the second frequency band.

9. A method for video recording for a vehicle, the method comprising:
   determining a plurality of channel state information (CSI) values using a first wireless module and a second wireless module, wherein determining the plurality of channel state information (CSI) values further comprises:
      transmitting a plurality of original training signals on a plurality of subcarriers within a first frequency band using the first wireless module, wherein the plurality of original training signals are known signals which are transmitted for purposes of CSI value estimation, and wherein the first wireless module is a digital wireless local area network (WLAN) transceiver system configured to implement a wireless communication protocol;

receiving a first plurality of propagated training signals using the second wireless module, wherein the second wireless module is a signal conversion device configured to convert signals between the first frequency band and a second frequency band;

converting the first plurality of propagated training signals from the first frequency band to the second frequency band using the second wireless module;

transmitting the first plurality of propagated training signals on the second frequency band using the second wireless module;

receiving a second plurality of propagated training signals using the first wireless module;

determining a second deviation between the plurality of original training signals and the second plurality of propagated training signals; and determining the plurality of channel state information (CSI) values based at least in part on the second deviation;

determining an occupancy status of an environment surrounding the vehicle based at least in part on the plurality of channel state information (CSI) values, wherein the occupancy status includes at least one of an occupied status and an unoccupied status; and recording a video using a camera system in response to determining that the occupancy status is the occupied status.

10. The method of claim 9, wherein determining the occupancy status of the environment surrounding the vehicle based at least in part on the plurality of channel state information (CSI) values further comprises:

determining a plurality of dynamic CSI values from the plurality of channel state information (CSI) values; and determining the occupancy status of the environment surrounding the vehicle based at least in part on the plurality of dynamic CSI values.

11. The method of claim 10, wherein determining the plurality of dynamic CSI values from the plurality of channel state information (CSI) values further comprises:

calculating the plurality of dynamic CSI values by calculating a derivative of the plurality of CSI values.

12. The method of claim 11, wherein determining the occupancy status of the environment surrounding the vehicle further comprises:

calculating a plurality of dynamic CSI value magnitudes, wherein each of the plurality of dynamic CSI value magnitudes is a magnitude of one of the plurality of dynamic CSI values;

calculating a norm of the plurality of dynamic CSI value magnitudes;

calculating a time averaged norm signal based at least in part on the norm; and determining the occupancy status of the environment surrounding the vehicle based at least in part on the time averaged norm signal.

13. The method of claim 12, wherein determining the occupancy status of the environment surrounding the vehicle further comprises:

continuously comparing the time averaged norm signal to a predetermined time averaged norm signal threshold; and determining the occupancy status to be the occupied status in response to determining that the time averaged norm signal is greater than or equal to the predetermined time averaged norm signal threshold for at least a predetermined time-period.

14. A system for video recording for a vehicle, the system comprising:

a camera system;

a first wireless module, wherein the first wireless module is a digital wireless local area network (WLAN) transceiver system configured to implement a wireless communication protocol;

a second wireless module, wherein the second wireless module is a signal conversion device which converts signals between at least two frequency bands including a first frequency band and a second frequency band;

a controller in electrical communication with the camera system, the first wireless module, and the second wireless module, wherein the controller is programmed to:

transmit a plurality of original training signals to the second wireless module on a plurality of subcarriers within the first frequency band using the first wireless module, wherein the plurality of original training signals are known signals which are transmitted for purposes of channel state information (CSI) value estimation;

receive a first plurality of propagated training signals using the second wireless module;

convert the first plurality of propagated training signals from the first frequency band to the second frequency band using the second wireless module;

transmit the first plurality of propagated training signals to the first wireless module on the second frequency band using the second wireless module;

receive a second plurality of propagated training signals using the first wireless module;

determine a deviation between the plurality of original training signals and the second plurality of propagated training signals;

determine a plurality of CSI values based at least in part on the deviation between the plurality of original training signals and the second plurality of propagated training signals;

determine an occupancy status of an environment surrounding the vehicle based at least in part on the plurality of CSI values, wherein the occupancy status includes one of an occupied status and an unoccupied status; and record a video using the camera system in response to determining that the occupancy status is the occupied status.

15. The system of claim 14, wherein to determine the occupancy status of the environment surrounding the vehicle, the controller is further programmed to:

calculate a plurality of CSI value derivatives, wherein at least one of the plurality of CSI value derivatives corresponds to each of the plurality of subcarriers;

calculate a plurality of CSI value derivative magnitudes, wherein each of the plurality of CSI value derivative magnitudes is a magnitude of one of the plurality of CSI value derivatives;

calculate a norm of the plurality of CSI value derivative magnitudes;

calculate a time averaged norm signal based at least in part on the norm;

determine the occupancy status of the environment surrounding the vehicle based at least in part on the time averaged norm signal;

continuously compare the time averaged norm signal to a predetermined time averaged norm signal threshold; and determine the occupancy status to be the occupied status in response to determining that the time averaged norm signal is greater than or equal to the predetermined time averaged norm signal threshold for at least a predetermined time-period.

16. The system of claim 15, wherein the signal conversion device further comprises:
a power source;
at least two antennas;
a conversion circuit in electrical communication with the power source and the at least two antennas, the conversion circuit including:
 a frequency mixer in electrical communication with the at least two antennas;
 an oscillator in electrical communication with the frequency mixer
 a first amplifier in electrical communication with a first of the at least two antennas and the frequency mixer;
 a second amplifier in electrical communication with the frequency mixer and a second of the at least two antennas
 a first bandpass filter in electrical communication with the first amplifier and the frequency mixer; and
 a second bandpass filter in electrical communication with the frequency mixer and the second amplifier.

* * * * *